United States Patent [19]

Manz et al.

[11] Patent Number: 5,080,132
[45] Date of Patent: Jan. 14, 1992

[54] REFRIGERATION EQUIPMENT SERVICE APPARATUS WITH QUICK-DISCONNECT COUPLINGS

[75] Inventors: Kenneth W. Manz, Paulding, Ohio; Richard Parks, Horton, Mich.

[73] Assignee: Kent-Moore Corporation, Warren, Mich.

[21] Appl. No.: 610,282

[22] Filed: Nov. 5, 1990

Related U.S. Application Data

[62] Division of Ser. No. 334,178, Apr. 6, 1989, Pat. No. 5,005,375.

[51] Int. Cl.⁵ .................................................. F16L 29/00
[52] U.S. Cl. ............................... 137/614.04; 251/149.6; 62/292
[58] Field of Search ............... 137/614.04; 251/149.6; 285/315, 321; 62/292, 298

[56] References Cited

U.S. PATENT DOCUMENTS 3,712,336  1/1973  Bell, Jr. ........................ 137/614.04
4,637,432  1/1987  Medvick et al. ............... 137/614.04

Primary Examiner—Henry A. Bennett
Attorney, Agent, or Firm—Barnes, Kisselle, Raisch, Choate, Whittemore & Hulbert

[57] ABSTRACT

A system for servicing refrigeration equipment having at least one service fitting of first predetermined configuration includes devices for recovering, purifying and/or recharging refrigerant within such equipment. A manifold includes a first refrigerant hose or conduit having an end coupling for releasable connection to the service fitting of the equipment under service and a second refrigerant hose or conduit having an end coupling for selective releasable connection to service fittings on each of the refrigerant service devices. Each of the first and second couplings includes facility for automatically sealing the associated conduit upon disconnection from the fittings, and thereby sealingly retaining refrigerant within the conduits. Thus, the manifold permits the service technician to connect and disconnect refrigerant service devices at will to and from the refrigeration equipment under service, with the manifold conduits remaining charged with refrigerant between connections and thereby eliminating the necessity in use of prior art devices for bleeding air and refrigerant from the service system into the atmosphere.

14 Claims, 3 Drawing Sheets

REFRIGERATION EQUIPMENT SERVICE APPARATUS WITH QUICK-DISCONNECT COUPLINGS

This is a divisional of copending application Ser. No. 07/334,178, filed on 4/6/89 now U.S. Pat. No. 5,005,375.

The present invention is directed to devices for recovering refrigerant from refrigeration systems such as air conditioning and heat pump systems, purification of recovered refrigerant for removal of water or other contaminants, and/or charging of refrigeration systems using stored or purified refrigerant. The invention is also directed more particularly to a quick-disconnect coupling arrangement for interconnecting the refrigeration equipment and service devices while avoiding leakage of refrigerant to the atmosphere.

BACKGROUND AND OBJECTS OF THE INVENTION

U.S. Pat. No. 4,688,388, assigned to the assignee hereof, discloses apparatus for service and recharge of refrigeration equipment, with particular application to automotive air conditioning equipment. A vacuum pump and a refrigerant charge container are housed within a wheel-mounted cabinet and configured for selective connection to refrigeration equipment under service, by hoses and electrically operated solenoid valves carried by the cabinet. The refrigerant container is carried by a scale that provides electrical output signals as a function of weight of refrigerant remaining in the container. A microprocessor-based controller receives the scale signals and control signals from an operator panel for automatically cycling through vacuum and refrigerant charge stages in a programmed mode of operation. The microprocessorbased controller includes an alphanumeric keypad for operator programming of vacuum time and refrigerant charge quantities in a program mode of operation, an alphanumeric digital display for indicating vacuum time and charge quantities, and facility for self- or operator- implemented diagnostics. Operating conditions and stages are displayed to the operator.

U.S. Pat. No. 4,768,347, also assigned to the assignee hereof, discloses a refrigerant recovery system that includes a compressor having an input coupled through an evaporator and through a solenoid valve to the refrigeration equipment from which refrigerant is to be withdrawn, and an output coupled through a condenser to a refrigerant storage container or tank. The evaporator and condenser are contained within a closed cylindrical canister for heat exchange and oil separation, the canister having an oil drain in the bottom. The refrigerant storage container is carried by a scale having a limit switch coupled to the control electronics to prevent or terminate further refrigerant recovery when the container is full. The scale comprises a platform pivotally mounted by a hinge pin to a wheeled cart that also carries the evaporator/condenser unit, compressor, control electronics, and associated valves and hoses.

U.S. application Ser. No. 157,579, filed Feb. 19, 1988 and assigned to the assignee hereof, discloses systems for recovering, purifying and recharging refrigerant in which, during a purification cycle, refrigerant is circulated from the refrigerant storage container in a closed path through a circulation valve and a filter for removing water and other contaminants, and then returned to the container. U.S. application Ser. No. 263,887, filed Oct. 28, 1988 and also assigned to the assignee hereof, discloses a refrigerant recovery system that includes a refrigerant storage container, refrigeration circuitry for withdrawing refrigerant from equipment under service and feeding such refrigerant to the container for storage, and a scale supporting the container for sensing impending overfill of the container. The scale includes a beam horizontally rigidly cantilevered from a base. A switch is positioned adjacent to the cantilever-remote end of the beam, and is responsive to deflection of the beam to indicate impending overfill of the container and prevent or terminate operation or the refrigerant recovery system.

A problem with refrigeration service devices of the subject character, including the devices disclosed in the abovenoted patents and applications, lies in potential for escape of refrigerant to the atmosphere when the devices are connected to and disconnected from the equipment under service and each other. Thus, conventional practice typically requires "cracking" of interconnections to purge air from the service system when the devices are initially connected to the equipment for service, with consequent loss of refrigerant during the purging operation. There is also potential for substantial loss of refrigerant in the interconnection hoses and manifold when the devices are disconnected from the equipment as part of or following the service operation. Thus, although the refrigerant recovery and/or purification systems disclosed in the noted patents and applications recover and recycle a major portion of the refrigerant in equipment under service, there remains the problem of leakage and escape of refrigerant during the connection and disconnection operations. Many scientists contend that release of halogen refrigerants into the atmosphere deleteriously affects the ozone layer that surrounds and protects the earth from ultraviolet solar radiation. Recent international discussions and treaties, coupled with related regulations and legislation, have further increased interest in preventing such refrigerant leakage.

A general object of the present invention, therefore, is to provide a system for servicing refrigeration equipment that reduces or eliminates leakage and escape of refrigerant to the atmosphere during the process of connecting and disconnecting the service devices to and from the equipment under service. Another and more specific object of the invention is to provide a coupling that is construction for rapid connection and disconnection to and from equipment under service, that is particularly well adapted for use in conjunction with service of refrigeration equipment having service fittings of predetermined industry-standard contour, and that is economical to manufacture and reliable over an extended operating lifetime. Yet another object of the invention is to provide a service manifold assembly having refrigerant conduits and quickdisconnect couplings of the subject character that is specifically adapted for use by service operators who already have a number of service devices, who do not wish to purchases redundant equipment, and yet who desire to prevent leakage of refrigerant into the atmosphere.

SUMMARY OF THE INVENTION

A system in accordance with the present invention, for servicing refrigeration equipment having at least one service fitting of first predetermined configuration, with or without an internal refrigerant flow valve, includes one or more devices for servicing refrigerant within such equipment, such as devices for recovering, purifying and/or recharging refrigerant. A manifold includes a first refrigerant hose or conduit having an end coupling for releasable connection to the service fitting of the equipment under service and a second refrigerant hose or conduit having an end coupling for selective releasable connection to service fittings on each of the refrigerant service devices. Each of the first and second couplings includes facility for automatically sealing the associated conduit upon disconnection from the fittings, and thereby sealingly retaining refrigerant within the conduits. This seal is automatically opened upon mating engagement of the coupling to a fitting. Thus, the manifold assembly permits the service technician to connect and disconnect refrigerant service devices at will to and from the refrigeration equipment under service, with the manifold conduits remaining charged with refrigerant between connections and thereby eliminating the necessity in use of prior art devices for bleeding air and refrigerant from the service system.

For use in conjunction with typical refrigeration equipment having service fittings at the high pressure and low pressure sides of the equipment compressor, the manifold in accordance with one preferred implementation of the invention includes a pair of hoses or conduits extending from opposed ends of a manifold pipe for selective connection to the equipment service fittings, and a center hose or conduit coupled to the pipe between the end conduits for selective connection to one or more service devices. Manual valves at opposed ends of the manifold pipe control flow of refrigerant through the high-side and low-side refrigerant hoses. Pressure gauges are mounted on the pipe for observation of high-side and low-side pressures in equipment under service, and the manifold may be suspended from external support structure to facilitate use. Thus, a service station already having multiple refrigerant service devices need only obtain a manifold of the described character to enjoy enhanced protection against refrigerant leakage in accordance with this aspect of the invention.

A second and related aspect of the invention finds particular utility in refrigerant recovery, purification and recharging systems of the type disclosed in U.S. application Ser. No. 157,579 noted above. That is, in devices of this character, a refrigerant storage container or tank is removably coupled to the service apparatus for receiving and storing refrigerant recovered from equipment under service, purifying recovered refrigerant, and/or recharging the equipment under service with new or recovered and purified refrigerant. Refrigerant storage containers or tank are conventionally supplied with inlet and outlet fittings of predetermined industry-standard contour, such as a one-quarter inch SAE flare size conforming to ANSI Standard B 70.1 (1974). The refrigerant service apparatus in accordance with this aspect of the invention includes one or more conduits or hoses that terminate in selfsealing quick-disconnect couplings specifically adapted for connection to such fittings. Such couplings not only retain refrigerant in the hoses when disconnected from the storage container, but also automatically operate upon connection to the container service fittings to open the internal valve in the quick-disconnect couplings.

In accordance with a further aspect of the present invention, there is thus provided a quick-disconnect coupling for connection to a fluid fitting, such as a refrigerant service fitting, having an open end of predetermined contour or configuration and external threads circumferentially surrounding such open fitting end. The coupling includes a body having an axial internal bore and an open end contoured to be telescopically received over the open end of the service fitting. The coupling body includes facility for sealing engagement with the open end of the service fitting when the body is received thereover. A collar is externally mounted on the coupling body an projects axially from the open end thereof, having a circumferential array of slots surrounding the open end of the coupling body and internal threads between the slots for engaging the external threads on the service fitting. A series of expansion elements, preferably spherical balls, are respectively positioned in the slots, and a locking sleeve is telescopically slidably received over the collar and locking elements. The locking sleeve has an internal shoulder for engaging the expansion elements and urging the expansion elements into the slots, thereby circumferentially expanding the slots and the thread-engaging portion of the collar as a function of axial position of the locking sleeve with respect to the collar. In the preferred embodiment of the quick-disconnect coupling in accordance with the invention, an internal channel in the sleeve circumferentially surrounds the collar between the ballengaging shoulder and the open end of the collar for releasably locking the expansion balls in their slot-expanding positions within the slots.

The coupling includes a plunger or poppet disposed in the bore of the coupling body and having a tip projecting into the open body end. A spring is captured in compression between the poppet and an opposing shoulder in the internal bore of the coupling body for urging the poppet against a valve seat at the open end of the body. The poppet tip engages the open end of the fitting to open the coupling valve as the coupling is brought into mating engagement with the fitting. In applications where the fitting includes an internal Schradertype valve, the poppet tip engages the valve stem as the coupling is received over the fitting to open the flow valve in the fitting.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENTS

Figure 1:
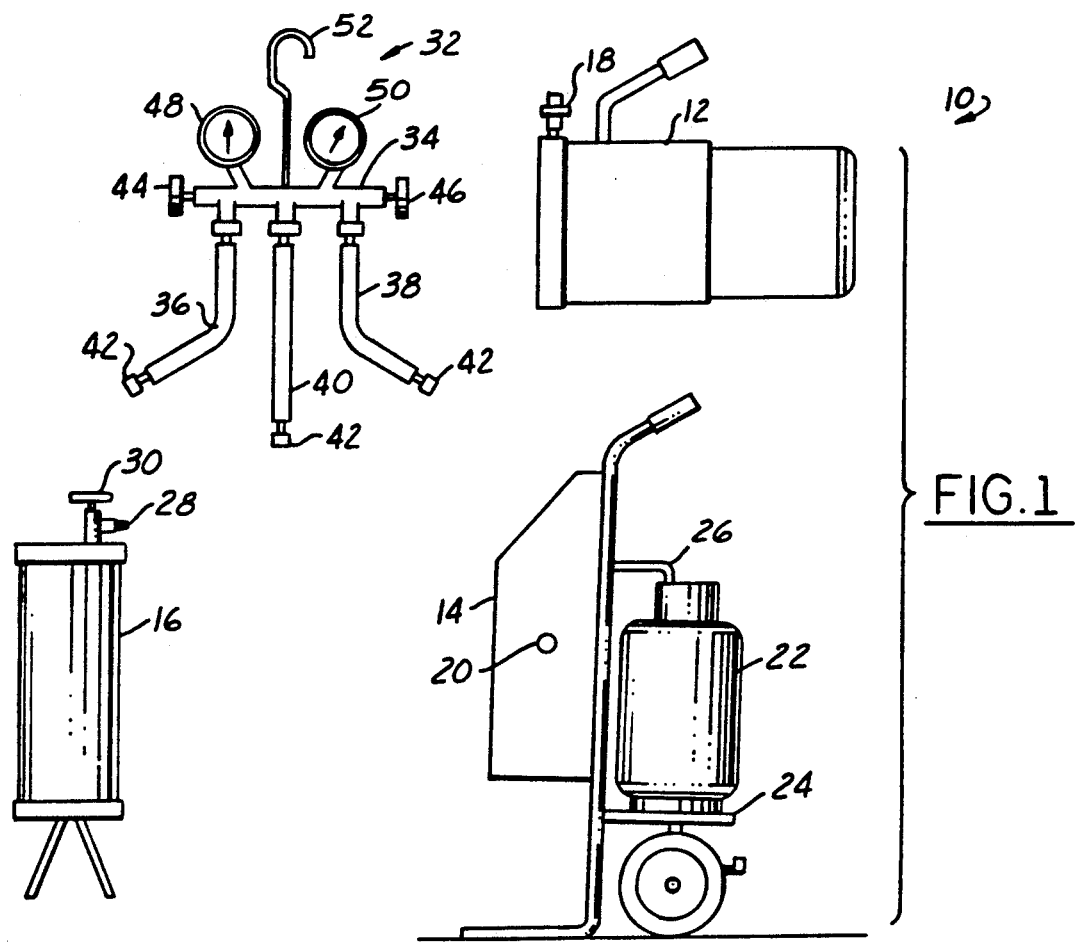
FIG. 1 is a schematic diagram of a system for servicing refrigeration equipment in accordance with one aspect of the present invention.

Refrigerant service system 10 in accordance with one implementation of the present invention is illustrated in FIG. 1 as comprising a plurality of refrigerant service devices —e.g., a vacuum pump 12, a refrigerant recovery device 14 (FIGS. 1 and 2) and a refrigerant recharging device 16. Pump 12 is of conventional construction and includes a service fitting 18 of preselected industry-standard configuration, preferably onequarter inch SAE flare size conforming to ANSI Standard B 70.1 (1974). Device 14 includes a service fitting 20 identical to fitting 18 of pump 12, and a refrigerant storage container or tank 22 mounted on a stand 24 for receiving recovered refrigerant through a hose or conduit 26. Recharging device 16, which may be of any suitable construction such as that disclosed in U.S. Pat. No. 4,688,388, includes a fitting 28 identical to fittings 18, 20, and a manual valve 30 for connecting fitting 28 to the internal construction of device 16.

A manifold assembly 32 includes a hollow pipe 34 having a first pair of refrigerant hoses or conduits 36, 38 extending from opposed ends thereof, and a third hose or conduit 40 extending from the mid portion of pipe 34 between the end conduits. Each hose or conduit 36-40 terminates in an associated self-sealing quick-disconnect coupling 42. A pair of manual valves 44, 46 are positioned at the opposed ends of manifold pipe 34 for controlling connection between center hose 40 and respect end hoses 36, 38. A pressure gauge 48, 50 is mounted adjacent to the respective manifold ends for indicating pressure of refrigerant. A hook or hanger 52 is coupled to pipe 34 for suspending the entire manifold assembly 32 from suitable convenient support structure (not shown).

Figure 2:
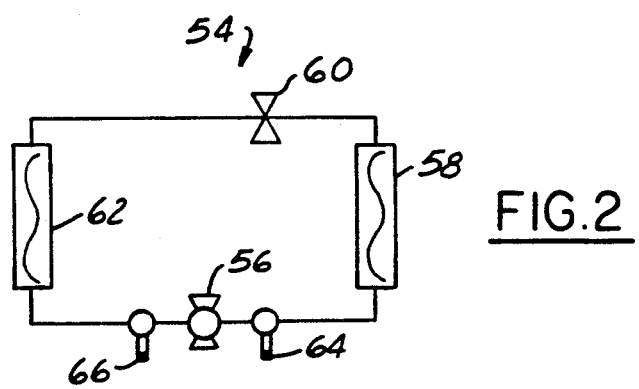
FIG. 2 is a schematic diagram of typical refrigeration equipment that can be serviced in accordance with the preferred application of the invention.

FIG. 2 illustrates exemplary refrigeration equipment 54 to be serviced as including a compressor 56 having a high pressure output connected through a condenser 58, a capillary tube or expansion valve 60 and an evaporator 62 to the low pressure compressor return input. A pair of service fittings 64, 66 of predetermined industry standard contour, such as the one-quarter inch SAE flare size noted above, is conventionally provided at the high pressure and low pressure sides of compressor 56 for service of the refrigeration equipment.

In use of system 10 (FIG. 1) to service equipment 54 (FIG. 2), the service operator or technician would typically close valves 44, 46 on manifold assembly 32, connect fitting 42 of hose 36 to low-side service fitting 66, and connect coupling 42 of hose 38 to high-side service fitting 64. To recover refrigerant within equipment 54, the technician would than connect coupling 42 of hose 40 to fitting 20 of device 14, open valves 44, 46 on manifold assembly 32, and then operate device 14 to transfer refrigerant from equipment 54 to container 22. To recharge equipment 54 after refrigerant has been withdrawn, or to charge new equipment, the technician would then disconnect coupling 42 of hose 40 from fitting 20, connect the coupling and hose to fitting 18 of vacuum pump 12, and operate the pump to evacuate equipment 54. The technician would then close valves 44, 46 to maintain such vacuum, disconnect coupling 42 of hose 40 from fitting 18 on vacuum pump 12, and attach hose 40 to fitting 28 of charging device 16. Valves 30, 44, 46 are then opened to being the charging operation. After completing of the charging operation, the technician would disconnect hoses 36, 38 of manifold 32 from equipment 54. If the operator desires to remove liquid refrigerant from within hoses 36, 38, 40, coupling 42 of hose 40 is then attached to fitting 20 of recovery device 14, and the recovery device is operated to evacuate the hoses. During the various connections and disconnections when employing prior art systems as noted above, refrigerant within the hose or hoses tended to escape into the atmosphere. Further, it was necessary to bleed air from the system on occasion, resulting in loss of additional refrigerant. However, system 10 employing self-sealing quick-disconnect fittings in accordance with the invention reduces or eliminates such leakage problem.

Figure 3:
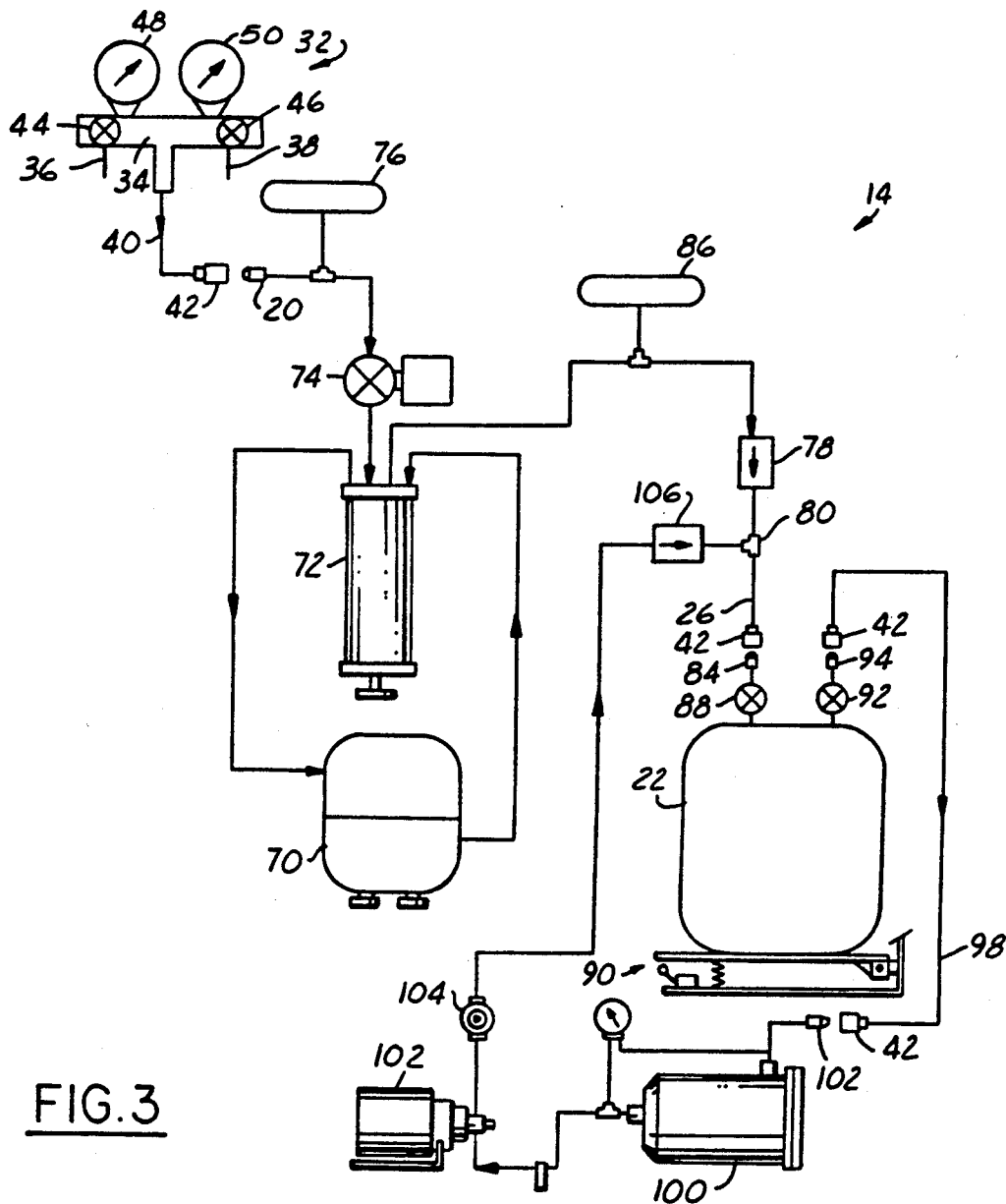
FIG. 3 is a schematic diagram of another embodiment of a refrigeration service system in accordance with the invention.

FIG. 3 illustrates recovery device 14 in greater detail as comprising a compressor 70 having an inlet that is coupled to manifold 32 (FIGS. 1 and 3) through the evaporator section of a combined heat-exchange oil-separation unit 72, through a solenoid valve 74 and through hose 40. A pressure switch 76 is connected between solenoid valve 28 and fitting 20, and is responsive to a predetermined low pressure to the compressor input from the refrigeration equipment under service (FIG. 2) to indicate removal or recovery of refrigerant therefrom. The outlet of compressor 70 is connected through the condenser portion of heat-exchange oil-separation unit 72, through a check valve 78, a tee 80, hose 26 (FIGS. 1 and 3) and a self-sealing quick-disconnect coupling 42, to the fitting 84 at the inlet port of tank 22. The tank inlet port is equipment with the usual manual valve 88. A pressure switch 86 is connected between unit 72 and check valve 78, and is responsive to vapor pressure within tank 22 with valve 88 open to indicate an excessive vapor pressure of predetermined level therewithin.

Tank 22 is mounted on a scale 90 that provides on output signal to the system control electronics (not shown) indicative of weight of refrigerant within container 22. The container liquid port is connected through a manual valve 92, a fitting 94, a coupling 42 and a hose 98 to a replaceable-core filter/dryer unit 100 of any suitable conventional type. Liquid is drawn through unit 100 by a pump 102, which returns liquid refrigerant through a moisture indicator 104 and a check valve 106 to tee 80, and thence to container 22. To the extent thus far described, recovery device 14 is essentially the same as that disclosed in U.S. Pat. No. 4,768,347 and U.S. application Ser. No. 157,579, the disclosures of which are incorporated herein by reference. It will be noted in connection with one distinguishing feature of the present invention, however, that container 22 is connected to recovery unit 14 and purification filter 100 by hoses 26, 98 that include self-sealing quickdisconnect couplings 42. Thus, container 22 maybe readily replaced when full without escape or leakage of refrigerant.

Figure 5:
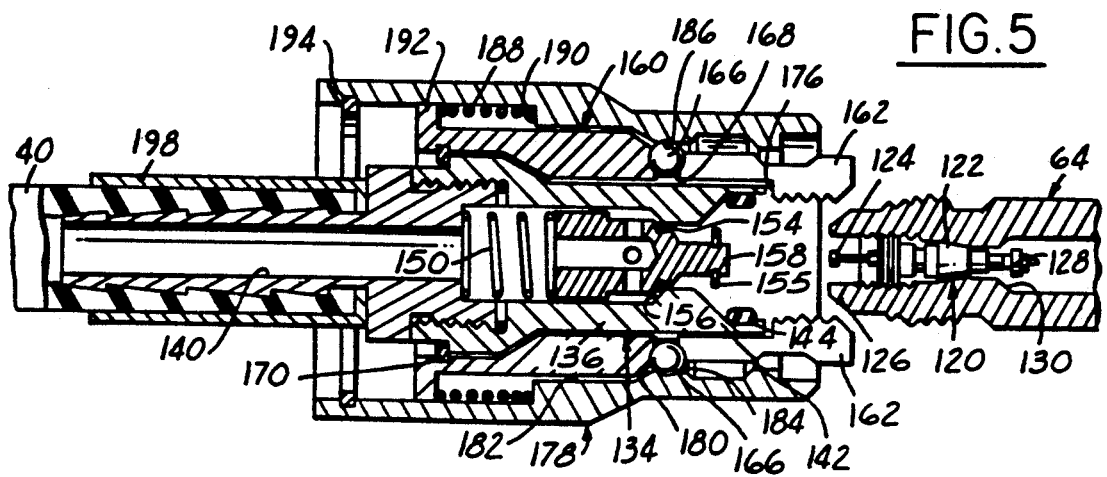
FIG. 5 is a sectional view similar to that of FIG. 4 showing the quick-disconnect coupling in open condition for receipt over a service fitting.
Figure 4:
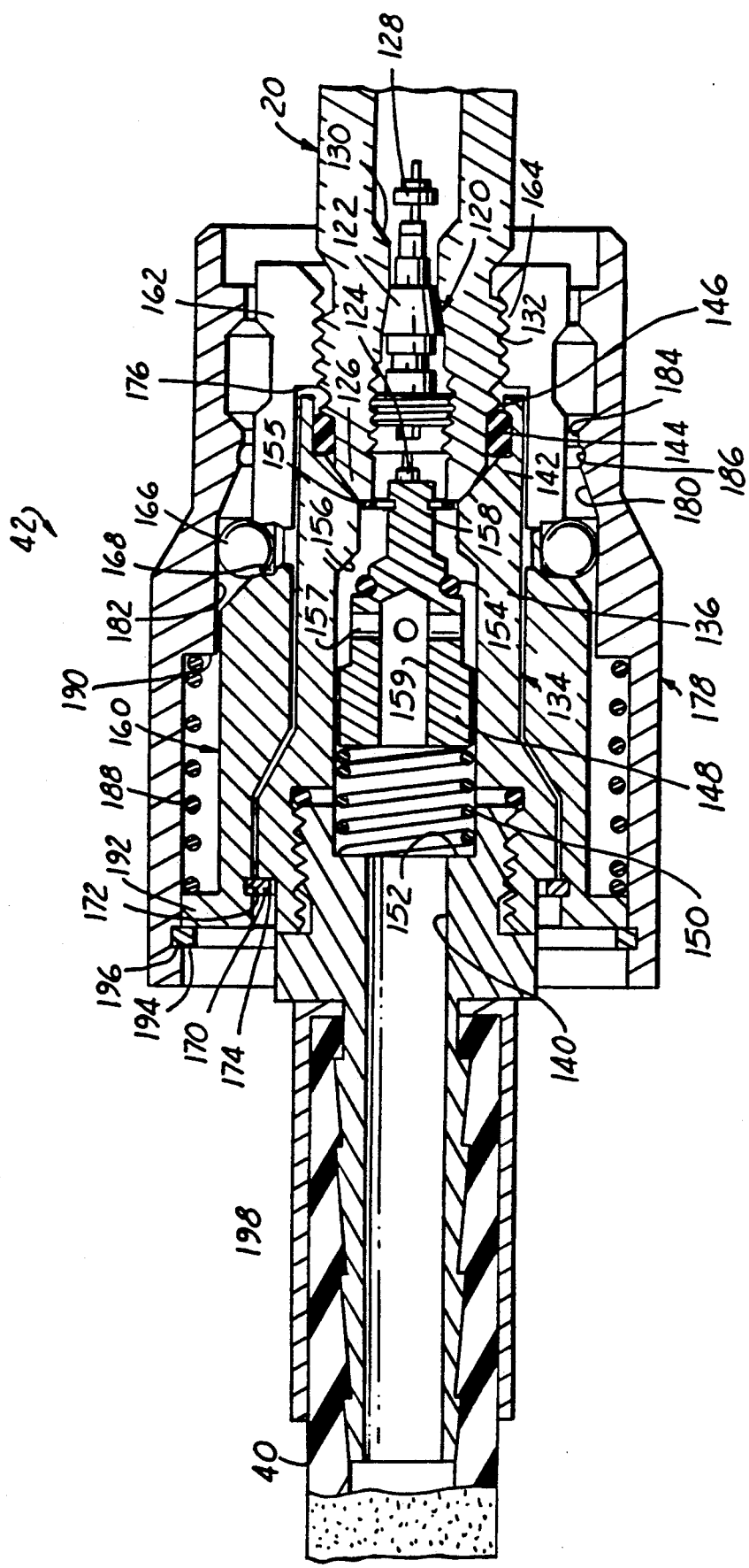
FIG. 4 is a fragmentary sectional view diametrically bisecting of a self-sealing quick-disconnect coupling for refrigeration equipment service in accordance with another aspect of the present invention.

FIGS. 4 and 5 illustrate self-sealing quick-disconnect coupling 42, in accordance a presently preferred embodiment of the invention, in conjunction with a service fitting 64 having an internal Schrader-type valve 120. It will be appreciated, however, that coupling 42 operates with fittings having manual valves, such as valves 88, 92 associated with fitting 88, 94 (FIG. 3). That is, as will be described in greater detail hereinafter, coupling 42 is designed to be self-opening open engagement with fitting 64, and also to open valve 120 of fitting 64 if the fitting is equipped with such a valve. If the fitting is not equipped with a Schrader-type valve, and fittings 18, 20, 28 (FIG. 1) typically would not, then the associated manual valve —e.g., valves 30 (FIG. 1) and 88, 92 (FIG. 3)— would be opened as usual after coupling 42 is fitted.

The external contours of service fittings 18, 20, 28, 64, 66, 84, 94, 102 are identical, preferably of one-quarter inch SAE flare size as previously noted. Schrader valve 120, where employed, has a core 122 and a stem 124. A spring (not shown) within core 122 normally urges stem 124 toward the open end 126 of fitting 64, simultaneously bringing the valve element or plunger 128 into sealing abutment with the internal fitting shoulder 130 as shown in FIG. 5. The internal passage 131 of fitting 64 is thus sealed against refrigerant leakage. Depression of stem 124 opens valve 120, as shown in FIG. 4. External threads 132 surround open fitting end 126.

Coupling 42, in accordance with the embodiment of the invention illustrated in FIGS. 4 and 5, comprises a coupling body 134 formed by a sleeve 136 mounted on an externally threaded fitting 138. Body 134 has an internal bore 140 that extends to a flared open end 142 adapted to be telescopically received over end 126 of fitting 64. A resilient ring 144 is captured within an internal groove 146 at body end 142 for sealing engagement with a corresponding outer surface of fitting end 126 adjacent to threads 132. A plunger or poppet 148 is telescopically slidably received within bore 140, and is resiliently urged toward end 142 by a coil spring 150 captured in compression between poppet 134 and an opposing shoulder 152 in bore 140. A resilient ring 154 is carried at the springremote end of poppet 148 and cooperates with an opposing internal conical shoulder 156 adjacent to end 142 for sealing coupling 42. A tip 158 integrally outwardly projects from poppet 148 coaxially with bore 40 for abutting engagement with valve stem 124 when coupling body 136 is telescopically received over fitting 64 equipped with valve 120, as shown in FIG. 4. A grip ring 155, preferably a so-called E-type snap ring, is carried in a groove adjacent to the end of tip 158 for abutting engagement with end 126 of fitting 64 as body 134 is received thereover. An internal passage 159 opens from the tip-remote end of poppet 148 coaxially with bore 140, and through an array of ports 157 to the periphery of poppet 148 behind sealing ring 154.

A collar 160 is telescopically externally received around coupling body 134. Collar 160 projects axially outwardly from end 142 of body 134, and has an angularly spaced array of four axial slots 162 circumferentially surrounding the open end of body 134. Internal threads 164 on collar 160 are positioned outwardly adjacent to body end 142 between slots 162 for releasable engagement with external threads 132 on fitting 120. A series of slot-expanding spherical latch balls 166 are positioned in corresponding pockets 168 at the inner ends of respective slots 162. Collar 160 is free to rotate about coupling body 134, but is restrained from axial motion with respect thereto by a lock ring 170 received in a corresponding internal channel 172 adjacent to an external shoulder 174 at the back end of body 134, and a shoulder 176 (segmented by slots 162) adjacently opposed to open end 142 of body 134.

A locking sleeve 178 is telescopically externally received over and surrounds collar 160. A conical rearwardly facing internal shoulder 180 on sleeve 178 extends from an area of greater internal diameter 182 to an area of lesser internal diameter 184 within sleeve 178. An internal channel 186 is positioned adjacent to shoulder 180 within area 184 of lesser internal diameter between shoulder 180 and the open sleeve end surrounding slots 162. A coil spring 188 surrounds collar 160 and is captured in compression between a rearwardly facing internal shoulder 190 on sleeve 178 and a flange 192 that radiates from the opening-remote end of collar 160. Spring 188 thus urges sleeve 178 to the position illustrated in FIG. 4 at which latch balls 166 are surrounded by that portion 182 of sleeve 178 of greater internal diameter. A lock ring 194 is seated in an internal groove 196 on sleeve 178 externally adjacent to collar flange 192 for capturing sleeve 178 in assembly. Rearward or releasing motion of locking sleeve 178 is limited by spring 188 and shoulder 190. Hose 40 (FIGS. 1 and 3-5) is received over fitting 138 and is securely affixed thereto by the crimped ferrule 198.

In operation, locking sleeve 178 is first manually retracted to the position illustrated in FIG. 5 against the force of spring 188, so that latch balls 166 are urged radially inwardly by shoulder 180 so as to expand slots 162 and thus expand the effective opening of collar 160. When channel 186 registers radially with latch balls 166 as shown in FIG. 5, locking sleeve 178 is locked in position with the open collar end so expanded, the force of spring 188 alone being insufficient to cam balls 166 inwardly along the sloping sides of channel 186 and thereby release the locking sleeve. Poppet 148 is urged by spring 150 into sealing engagement with shoulder 156 as shown in FIG. 5. Thus, hose 140 is sealed against leakage of refrigerant.

With the open end of collar 160 so expanded, coupling 42 maybe fitted over fitting 64 so that fitting end 126 is telescopically received within body end 142 and sealed with respect thereto by ring 144. During such interengagement, ring 155 engages end 126 of fitting 64, so that the force of urging body 134 over fitting 64 simultaneously opens poppet 158 with respect to shoulder 156. At the same time, poppet tip 158 engages valve stem 124 so as to urge plunger 128 out of engagement with fitting shoulder 130. Thus, in the fully coupled position illustrated in FIG. 4, refrigerant or other fluid may freely flow through valve 120, ring 155 and around poppet 148, through internal passages 157, 159 and through fitting 138 and hose 40. Locking sleeve 178 is then manually urged forwardly over collar slots 162, so that balls 166 are first urged inwardly by the slopping side of channel 186, and then released outwardly along shoulder 180 so that slots 162 and collar 134 contract into locking engagement with threads 132 on fitting 20. At this point, ring 144 is captured in sealing compression between body end 142 and fitting end 126. When it is desired to remove the coupling, locking sleeve 78 is again manually retracted from the position of FIG. 4 to the position of FIG. 5, and, as coupling 42 is axially removed from fitting 64, poppet 148 seals against shoulder 156 and fitting internal valve 120 closes against shoulder 130.

Figure 6:
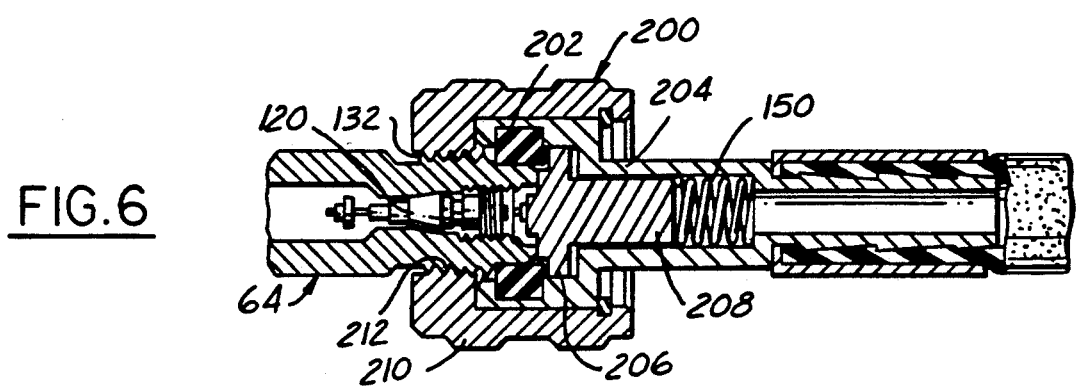
FIG. 6 is a fragmentary sectional view similar to that of FIG. 4 but showing a quick-disconnect coupling in accordance with a modified embodiment of the invention.

FIG. 6 illustrates a modified self-sealing quickdisconnect coupling 200. A single annular sealing ring 202 within the coupling body 204 serves a dual purposes of sealingly engaging the outer surface of fitting 64 in the fully assembled condition illustrated in FIG. 6, and of sealingly engaging a radial flange 206 on poppet 208 when coupling 200 is disconnected from fitting 20. A collar 210 is rotatable around the outer circumference of body 204, and has internal threads 212 for engaging the external threads 132 on fitting 20. Thus, collar 210 and coupling 200 rotatably connected and disconnected from fitting 64, rather then snap-fit connected as with the coupling 42 of FIGS. 4 and 5. As coupling 200 is fitted over fitting 64, the fitting end urges poppet 208 out of engagement with seal 202. If fitting 64 is equipped with a valve 120, as shown in FIG. 6, poppet 208 simultaneously opens the valve.

We claim:

1. A quick-disconnect coupling for connection to a fluid fitting having an open end of predetermined configuration and external threads circumferentially surrounding said open end, said coupling comprising:
   a body having an axial bore and an open end contoured to the telescopically received over said open end of said fitting,
   means at said bore open end for sealingly engaging said open end of said fitting when said body is received thereover,
   a collar externally mounted on said body projecting axially from said open end of said bore, and having a circumferential array of slots surrounding said open end and means between said slots for engaging said external threads on said fitting,
   an array of expansion means respectively radially movably positioned in said slots, and
   a locking sleeve telescopically slidably received over said collar, said locking sleeve having an internal shoulder for engaging said expansion means and urging said expansion means into said slots, and thereby circumferentially expanding said slots and said thread-engaging means, as a function of axial position of said locking sleeve with respect to said collar.

2. The coupling set forth in claim 1 wherein said locking sleeve further comprises an internal channel circumferentially surrounding said collar between said shoulder and said open end for releasably locking said expansion means in slot-expanding position within said slots.

3. The coupling set forth in claim 2 wherein said expansion means comprise spherical balls, said slots including radially outwardly oriented pockets for receiving said balls, and wherein said shoulder on said locking sleeve is of conical contour coaxial with said collar from a lesser internal diameter adjacent to said channel is a greater internal diameter remotely of said channel.

4. The coupling set forth in claim 3 further comprising means resiliently urging said locking sleeve toward said open end of said body.

5. The coupling set forth in claim 4 wherein said resiliently-urging means comprises a coil spring captured in compression between said collar and said locking sleeve.

6. The coupling set forth in claim 5 wherein said collar includes an integral flange at an end thereof remote from said slots, wherein said locking sleeve includes a second internal shoulder axially opposed to said flange, and wherein said coil spring surrounds said collar between said flange and said second shoulder.

7. The coupling set forth in claim 6 wherein said body has a external shoulder at a end thereof remote from said open end, wherein said collar has an internal shoulder axially opposed to said body open end and an internal groove adjacent to said body external shoulder, and further comprising a lock ring in said collar internal groove cooperating with said body shoulder to fasten said collar on said body permitting free rotation of said collar while restraining axial motion of said collar with respect to said body.

8. The coupling set forth in claim 7 wherein said locking sleeve includes a second internal groove adjacent to said collar flange, and further comprising a second lock ring in said second locking sleeve groove fastening said locking sleeve onto said collar permitting free rotation of said locking sleeve on said collar while restraining axial motion of said locking sleeve with respect to said collar.

9. The coupling set forth in claim 3 further comprising:
   a poppet disposed in said bore and including means adjacent to said open end for engaging the fitting as said body is fitted thereto,
   a spring in said bore urging said poppet toward said open end of said body, and
   valve seat means on said poppet and body at said open body end for sealingly closing said bore, abutting engagement of said means on said poppet and said fitting opening said valve seat means.

10. The coupling set forth in claim 9 wherein said valve seat means includes a first internal shoulder in said bore adjacent to said open body end, and sealing means on said poppet for engaging said first shoulder.

11. The coupling set forth in claim 10 wherein said bore further includes a second shoulder opposed to and spaced from said first shoulder, said spring comprising a coil spring captured in compression between said second shoulder and said poppet.

12. The coupling set forth in claim 11 further comprising passage means extending through said poppet.

13. The coupling set forth in claim 12 wherein said fitting-engaging means on said poppet comprises a snap ring carried at an end of said poppet within said opening.

14. The coupling set forth in claim 9 wherein said fitting has an internal valve coaxial within said open end with a valve stem that extends to adjacent said open end of said fitting for normally blocking flow of fluid through said fitting and for permitting fluid flow upon depression of said stem through said open end, and wherein said coupling further includes:
   a tip on said poppet projecting from said open end of said body for abutting engagement with said valve stem.

* * * * *